Jan. 7, 1964  W. H. PRICE  3,116,937
HANDLE FOR ROTARY LAWN MOWERS
Filed Sept. 24, 1962  2 Sheets-Sheet 1

INVENTOR.
WARREN H. PRICE
BY
Lieber & Nilles
ATTORNEYS

Jan. 7, 1964 W. H. PRICE 3,116,937
HANDLE FOR ROTARY LAWN MOWERS
Filed Sept. 24, 1962 2 Sheets-Sheet 2

INVENTOR.
WARREN H. PRICE
BY
*Lieber & Nilles*
ATTORNEYS

United States Patent Office 3,116,937
Patented Jan. 7, 1964

3,116,937
HANDLE FOR ROTARY LAWN MOWERS
Warren H. Price, South Milwaukee, Wis., assignor to Jacobsen Manufacturing Company, Racine, Wis., a corporation of Wisconsin
Filed Sept. 24, 1962, Ser. No. 225,700
3 Claims. (Cl. 280—47.37)

The present invention relates in general to lawn mowers, and more particularly to an improved means for mounting the handle thereto.

Handles for mowers of the type to which the present invention relates should be adjustable as to the height of their normal operating position to thereby accommodate persons of different heights. Furthermore, these handles should provide a certain amount of "float" in any one of the normal operating positions, so the handle can swing freely in a vertical direction a slight amount relative to the mower to thereby permit the mower to follow any undulating contour of the ground without vertical jerking movement being transmitted to the handle. This limited amount of "give" also permits the handle to accommodate obstacles; at the same time, however, a secure mounting must be provided to give complete and a feel of positive control to the operator. In addition, handles of this type must be capable of being readily swung to an inoperative, storage position, usually directly above the mower housing.

Accordingly, it is an object of the present invention to provide a handle for a rotary mower having the above desirable features and characteristics. The invention furthermore provides that these adjustments can be made quickly and easily by the operator without the use of separate parts which become lost or misplaced, and without attempting to "spring" the parts of the handle from one position to another, which may result in accidentally turning or twisting the mower, when operating, thereby causing injury to the operator or other bystanders.

These and other objects and advantages of the present invention will appear hereinafter as this disclosure progresses, reference being had to the accompanying drawings, in which.

Figure 1:
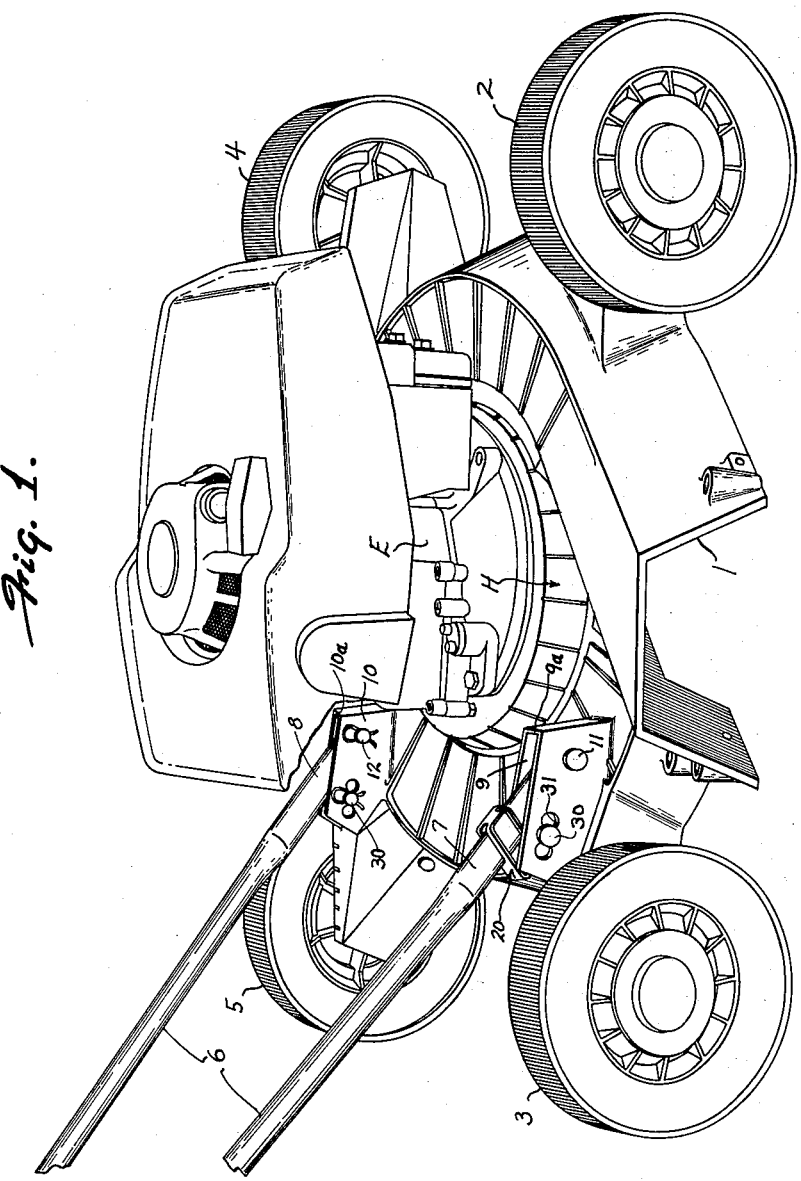
FIGURE 1 is a perspective view of a mower embodying the present invention, certain parts being shown as broken away or removed for the sake of clarity in the drawings.

Referring in greater detail to the drawings, the general mower structure with which the present invention is used comprises a housing H in which horizontally revolving blades (not shown) rotate and eject the grass clippings rearwardly and laterally through the discharge opening 1. An internal combustion engine E is mounted on the top of the housing and is connected to the blades for driving them. The mower is supported by the four ground wheels 2, 3, 4, and 5, and a handle 6 extends rearwardly from the mower at an angle to the ground in normal operating position.

The handle 6 has two forward ends 7 and 8 which are pivotally mounted in laterally spaced and similar mounting brackets 9 and 10 at the rear side of the housing. These brackets 9 and 10 are generally U-shape, when viewed in plan, and open rearwardly and upwardly and have a closed forward side 9a and 10a, respectively. These brackets may be formed as an integral part of the housing casting.

The handle ends 7 and 8 are pivotally mounted in their respective brackets by their pins 11 and 12 which extend through aligned apertures 13 in the forward part of the brackets and also extend through an aperture 14 in the handle ends.

The handle is thus pivoted to the housing and can be swung between any one of a number of selected operating poistions P1, P2, or P3, and a storage position PS in which it extends upwardly directly above the housing.

In accordance with the present invention, the handle can be quickly and easily moved to any one of these positions, and when in any one of the operating positions P1, P2, or P3, it is securely held therein for positive control of the mower, but it is also free to float within limits, as will now be described.

A hook member 20 is slidably mounted by its apertures 21 on at least one of the handle ends. The hook member extends rearwardly from the handle to which it is attached and terminates at its rear end in a forwardly facing hook portion 23. It will be noted that this hook portion is spaced a distance D (FIGURE 2) from the handle to which it is attached, and it is this spacing, as will more fully appear later, that provides the float feature for the handle.

Figure 2:
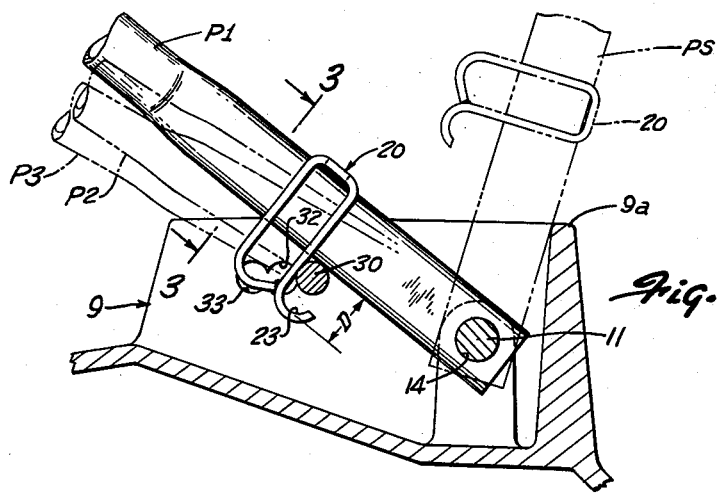
FIGURE 2 is a fragmentary side elevational view of the mower shown in FIGURE 1, but on an enlarged scale and with certain parts in section, removed, or broken away for clarity.
Figure 3:
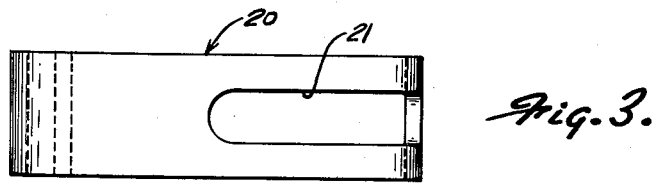
FIGURE 3 is a plan view of the handle hook as shown in FIGURE 2, and taken along line 3—3 in FIGURE 2.
Figure 4:
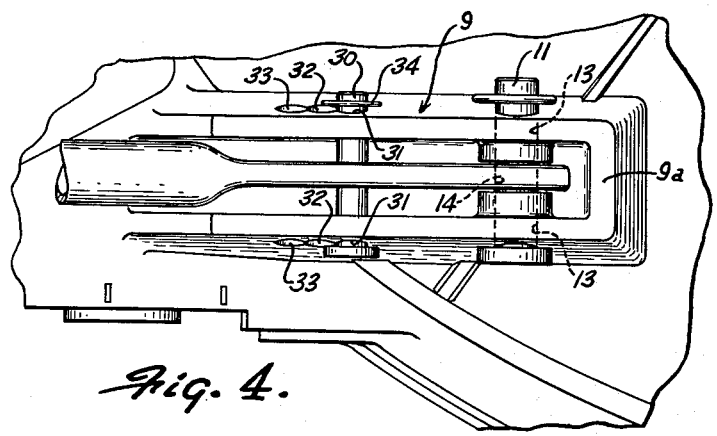
FIGURE 4 is a fragmentary plan view of one of the brackets as shown in FIGURE 2, with the hook member removed.

The hook member can be slid along the forward end of the handle from a raised position as shown by the broken lines in FIGURE 2 to a lower position in which it embraces or engages a pin 30.

The pin 30 is selectively mountable in any one of a number of positions in a generally fore and aft direction, which positions are provided by the pairs of aligned holes 31, 32, and 33 which are formed adjacent the rear end of at least one of the brackets such as bracket 9. This pin is held captive in the bracket in any one of its selected positions by means of cotter keys 34 or other similar fastening devices, such as snap rings (not shown), which are detachably engageable on the end of the pin.

The pin is adjustable in a fore and aft direction on the bracket so as to provide various operating heights for the handle. In other words, when the hook portion engages the pin when the latter is in the forward position (FIGURE 2), then the handle is located in its uppermost operating position. When the pin is located in the most rearward of its selected apertures 33 and the hook member then engaged on it, the handle would be in its lowermost position.

An amount of float for the handle is provided when in any of its positions P1, P2, or P3. This amount of float, that is, limited swinging movement of the handle, permits the mower to closely and freely follow the contour of the ground without causing the handle to jerk vertically in the operator's hands. This certain amount of flexibility in moving the handle relative to the mower when in operation is also desirable in order to accommodate any obstructions encountered by the handle.

Even though a certain amount of swing within limits is provided for the handle when in the operating positions, the operator nevertheless has positive control over the mower at all times even though the handle can swing from the position in which the hook firmly engages the pin and then rearwardly to a position where the hook is free of the pin but the handle bears against the forward side thereof as shown by the full lines in FIGURE 2.

In order to swing the handle to the vertical position directly above the mower, for storage purposes, for example, it is simply necessary to grasp the hook member and slide it upwardly along the handle to the position where the hook portion does not engage the pin when the handle is then swung upwardly to the storage position PS.

In this manner, the handle can be quickly and simply attached to the pin by swinging the handle rearwardly and lowering the hook member against the pin, the pin having been previously moved to its selected position for proper height of the handle.

The operator need not force the handle members in any particular direction in order to spring them from engagement with housing brackets, such as are utilized in prior art devices, nor is it necessary for the operator to use any special tools or detachable parts which may ultimately become lost or misplaced.

Various modes of carrying out the invention are contemplated as being within the scope of the following claims particularly pointing out and distinctly claiming the subject matter which is regarded as the invention.

I claim:

1. A rotary lawn mower comprising, a wheel-supported housing, a handle normally extending rearwardly from said housing and having a pair of forward ends pivotally mounted on said housing and about a transverse horizontal axis, a pin on said housing and adjacent one of said handle ends, means mounting said pin on said housing for adjustment to any one of a number of selected positions for abutting engagement by said handle and intermediate the length of said handle, and a hook member slidably mounted along said handle and in a plane containing said pin, said hook member having a forwardly facing hook portion spaced a distance rearwardly from said handle and also from said pin when the latter is in said abutting engagement with said handle to thereby permit engagement of said pin by said hook portion and a limited amount of free swinging of the handle.

2. The mower as defined in claim 1 including a pair of U-shaped brackets on said housing, which open rearwardly and upwardly, said handle forward ends being pivotally mounted in said brackets, and said pin being mounted in one of said brackets.

3. A mower as defined in claim 1 further characterized in that said hook member can be slid upwardly on said handle and free of said pin whereby said handle can then be swung to a substantially vertical position above said housing.

References Cited in the file of this patent

UNITED STATES PATENTS

| 599,208 | White | Feb. 15, 1898 |
| 2,709,882 | Abel | June 7, 1955 |
| 2,966,365 | Kortum | Dec. 27, 1960 |

FOREIGN PATENTS

| 311,069 | Great Britain | May 9, 1929 |